United States Patent

Swinley

[11] Patent Number: 6,092,956
[45] Date of Patent: *Jul. 25, 2000

[54] LOCKING DEVICE FOR USE WITH SHAFTS OR TUBES

[75] Inventor: George Swinley, Castleford, United Kingdom

[73] Assignee: NSK-RHP European Technology Co., Limited, United Kingdom

[ * ] Notice: This patent is subject to a terminal disclaimer.

[21] Appl. No.: 08/952,245

[22] PCT Filed: Feb. 6, 1997

[86] PCT No.: PCT/GB97/00336

§ 371 Date: Oct. 17, 1997

§ 102(e) Date: Oct. 17, 1997

[87] PCT Pub. No.: WO97/29293

PCT Pub. Date: Aug. 14, 1997

Related U.S. Application Data

[63] Continuation-in-part of application No. 08/619,591, Mar. 26, 1996, Pat. No. 5,678,949.

[30] Foreign Application Priority Data

Sep. 27, 1993 [GB] United Kingdom .................. 93 19880
Feb. 6, 1996 [GB] United Kingdom .................. 9602340

[51] Int. Cl.[7] .................................................. F16C 35/063
[52] U.S. Cl. .......................... 403/362; 403/373; 384/541
[58] Field of Search .................................... 403/362, 367, 403/366, 373, 370, 371, 365, 377, 409.1, 374.1, 374.2, 374.3, 374.4; 384/541

[56] References Cited

U.S. PATENT DOCUMENTS

| | | |
|---|---|---|
| 2,739,830 | 3/1956 | Firth . |
| 3,598,432 | 8/1971 | Walker . |
| 4,097,167 | 6/1978 | Stratienko .............................. 403/374.4 |
| 4,403,814 | 9/1983 | Koss et al. ............................... 384/541 |
| 4,483,513 | 11/1984 | Summers .................................. 403/362 |
| 5,269,118 | 12/1993 | Bullaro . |
| 5,678,949 | 10/1997 | Swinley ................................... 403/362 |

FOREIGN PATENT DOCUMENTS

| | | |
|---|---|---|
| 841107 | 6/1952 | Germany ................................. 403/362 |
| 3804655 A1 | 8/1989 | Germany . |
| 3822472 | 1/1990 | Germany . |
| 2282209 | 3/1995 | United Kingdom . |

*Primary Examiner*—Harry C. Kim
*Attorney, Agent, or Firm*—Samuels, Gauthier & Stevens

[57] ABSTRACT

A locking device for clamping onto a shaft is composed of a collar and a ring fitted onto the shaft. The collar has an end wall and an axial region extending over an outer inclined contact surface of the ring. The ring and the collar end wall have inner surfaces confronting the outer surface of the shaft which are separated by sliding radial surfaces of the collar and the ring. Screw-threaded elements set in threaded bores in the axial region of the collar can be tightened against the outer surface of the ring to cause contact zones of the inner surfaces to exert clamping force on the shaft at diametrically opposed positions.

33 Claims, 2 Drawing Sheets

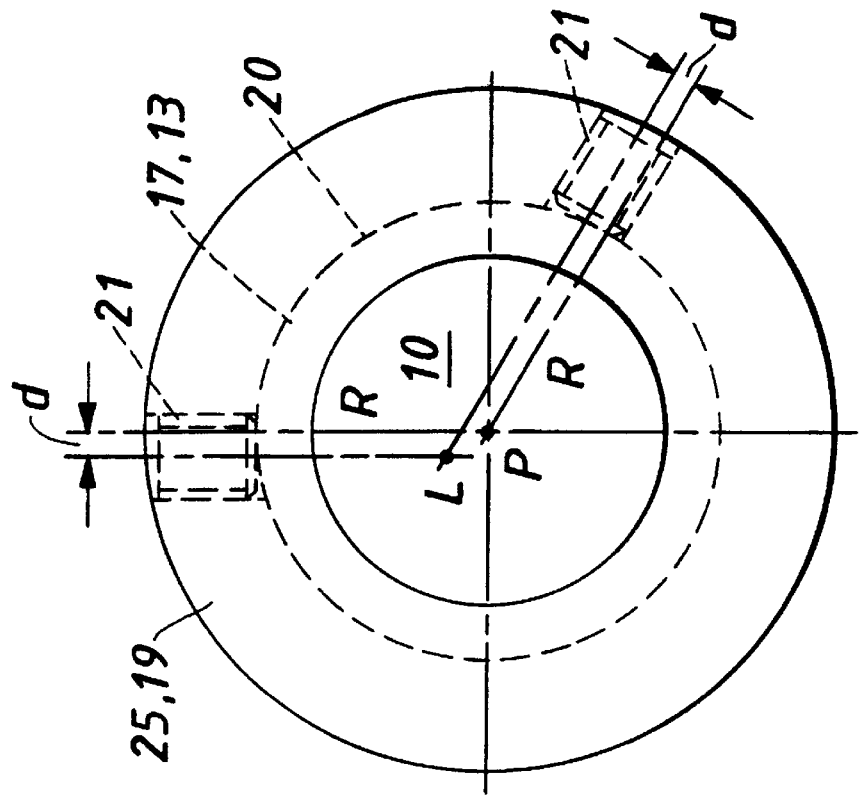
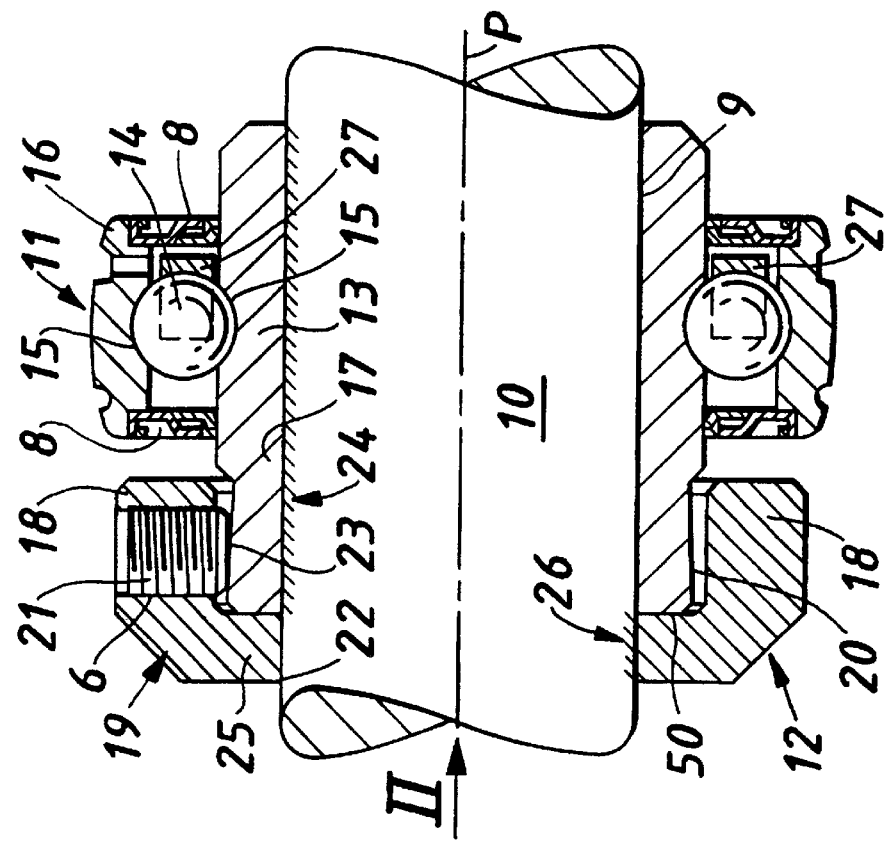

LOCKING DEVICE FOR USE WITH SHAFTS OR TUBES

This is a continuation-in-part of U.S. patent application Ser. No. 08/619,591 filed Mar. 26, 1996, now U.S. Pat. No. 5,678,949, which claims priority to PCT International Application No. PCT/GB94/02090 filed Sep. 26, 1994, which claims priority to United Kingdom Patent Application No. 9319880.2 filed Sep. 27, 1993, and to PCT International Application No. PCT/GB97/00336 filed Feb. 6, 1997 which claims priority to United Kingdom Patent Application No. 9602340.3 filed Feb. 6, 1996.

TECHNICAL FIELD

The present invention relates to a device which can be selectively locked or clamped to a rotatable component such as a shaft or tube.

BACKGROUND TO THE INVENTION

Our earlier U.K. Patent Application No. 9419372.9 (2 282 209A) describes locking devices which can be used with a rotatable component such as a shaft or a tube. Although such devices achieve a reliable locking function, a collar means of the device tends to tilt when the device is locked in position and hence wobbles when the shaft or tubes revolves. A general object of the present invention is to provide an improved form of locking device which overcomes this defect.

DISCLOSURE OF THE INVENTION

According to one aspect of the invention there is provided a device for locking to a component rotatable about an axis; said device comprising collar means having an end wall with a bore defining a surface for confronting an outer surface of the rotatable component and a region extending axially from the end wall, a ring for disposing between the axial region of the collar means and the component, the ring having a first inner surface for confronting the outer surface of the component and a second outer surface which is inclined relative to the axis of rotation to converge with respect to the axis of rotation in a direction away from the end wall and several screw-threaded elements received in screw-threaded bores extending through the axial region of the collar means and spaced apart relative to the rotational axis other than at 180°, the threaded bores being disposed in positions non-radial relative to the rotational axis. The arrangement is such that the screw-threaded elements can be tightened to bear into or against the second outer surface of the ring to cause the bore surface of the collar means and the first surface of the ring to act as contact surfaces with respect to the outer surface of the component which exert clamping force on the component at diametrically opposed zones.

According to another aspect of the invention there is provided a device for locking to a hollow component rotatable about an axis; said device comprising collar means having an end wall with an outer surface for confronting an inner surface of the component and a region extending axially from the end wall; a ring for disposing between the axial region of the collar means and the component, the ring having a first outer surface for confronting the inner surface of the component and a second inner surface which is inclined relative to the axis of rotation to diverge with respect to the axis of rotation in a direction away from the end wall and several screw threaded elements received in screw-threaded bores extending through the axial region of the collar means and spaced apart relative to the rotational axis other than at 180°, the threaded bores being disposed in non-radial positions relative to the rotational axis. The arrangement is such that the screw-threaded elements can be tightened to bear into or against the second inner surface of the ring to cause the outer surface of the ring and the outer surface of the end wall of the collar means to act as contact surfaces with respect to the inner surface of the component which exert clamping force on the component at diametrically opposed zones.

By arranging the screw-threaded elements in bores in non-radial positions on the collar means the tendency for the collar means to wobble as the rotatable component revolves can be prevented.

The threaded bores preferably have axes which intersect at a location offset from the rotational axis in an anticlockwise sense as viewed in the direction of the rotational axis and from the end wall of the collar means.

Preferably there are two screw-threaded elements with their rotational axes spaced apart around the location where the axes of the associated threaded bores intersect by about 120°. Each screw-threaded element thus has its axis offset from a true radial direction relative to the rotational axis.

The ends of the screw-threaded elements may have plane surfaces normal to their longitudinal axes or surfaces which are set at an angle which generally matches the angle of the second inclined surface of the ring. It is possible to provide shallow depressions, recesses or blind bores in the second surface for receiving the ends of the screw-threaded elements.

The surfaces of the collar means and the ring which confront the component normally lie parallel to the axis of rotation and directly adjacent and alongside one another to form a continuation of one another prior to the tightening of the screw-threaded elements. Between these contact surfaces there may be radial surfaces of the ring and the collar means which engage on one another and slide against one another as the screw elements are tightened or released.

The rotatable component may be a shaft or spindle with the locking device fitted onto its exterior periphery or a hollow shaft or tube with the locking device fitted inside.

It is not essential for the rotatable component to have a circular cross-section and the component can have a polygonal cross-section.

The invention may be understood more readily and various other aspects and features of the invention may become apparent, from consideration of the following description and accompanying drawings.

BRIEF DESCRIPTION OF DRAWINGS

Embodiments of the invention will now be described by way of examples only, with reference to the accompanying drawing wherein:

FIG. 1 is a part sectional side view representation of an assembly employing a locking device constructed in accordance with the invention;

FIG. 2 is an end view of the assembly shown in FIG. 1 taken in the direction of arrow II of FIG. 1;

DESCRIPTION OF BEST MODES OF CARRYING OUT THE INVENTION

Figure 3:
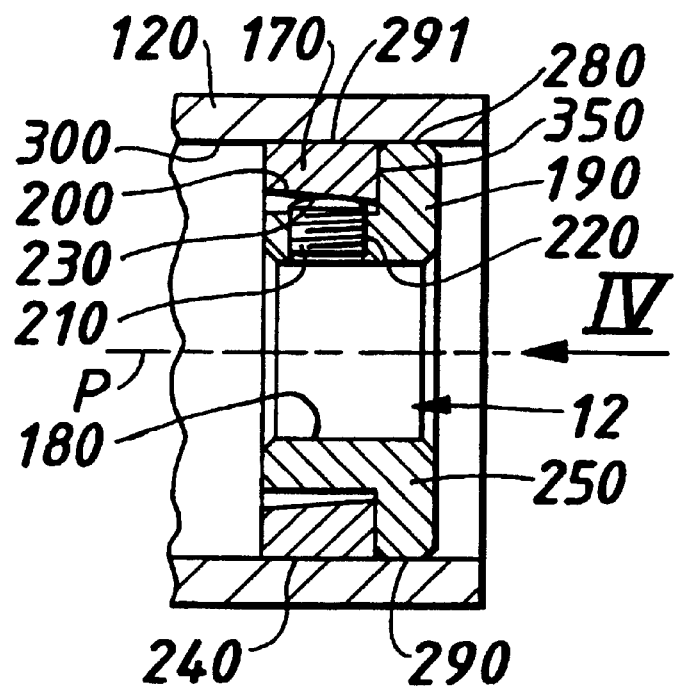
FIG. 3 is a part sectional side view representation of another assembly employing a locking device constructed in accordance with the invention.

FIGS. 1 and 3 generally correspond to FIGS. 1 and 2 of the aforementioned UK patent application 2282209A and use the same reference numerals. As shown in FIGS. 1 and 2, a shaft 10 carries a rolling-element bearing 11 and a locking device 12. The bearing 11 is composed of an extended inner ring 13 which is to be secured to the shaft 10 with the aid of the device 12 in a non-rotatable manner. The ring 13 has an inner bore surface 9 extending parallel to the outer peripheral surface of the shaft 10. A set of rolling elements, here in the form of balls 14, is disposed in raceways 15 between the inner ring 13 and an outer ring 16. The balls 14 are equi-distantly spaced apart round the raceways 15 with a cage 27 and seals 8 are mounted between the rings 13, 16.

An axial end region 17 of the inner ring 13 is surrounded by an axial region or portion 18 of a collar 19. The collar 19 has an end wall 25 with a bore forming a surface 22 fitted over the shaft 10 with the surface 22 forming a continuation of the inner surface 9 of the ring 13.

The axial region 17 of the bearing inner ring 13 is relieved to provide an outer surface 20 which is tapered to extend at an angle to the axis of the shaft 10. The surface 20 converges towards the shaft axis in the direction of the bearing 11. A typical angle for the surface 20 is 3° and generally an angle in the range 1° to 5° is preferred.

Two screws 21 are located in threaded bores 6 in the axial portion 18 of the collar 19.

As shown in FIG. 2, the screws 21 and the bores 6 are offset by the same distance 'd' from radial planes R in an anti clockwise direction. The radial planes R are spaced apart by 120° and represent the preferred locations of the screws 21 in accordance with UK patent application No. 2282209A. In contrast to the latter, the longitudinal axes of the screws 21 now intersect at point L spaced from the axis of rotation P and offset therefrom in an anti clockwise sense as viewed in the direction of arrow II, i.e. in the direction of the axis P from the end wall 25 of the collar 19 and the convergence of the surface 20.

The screws 21 can be displaced inwardly of the bores 6 to engage on the outer surface 20 of the ring 13. In a modified arrangement the surface 20 has shallow recesses or depressions or blind bores for locating and receiving the ends 23 of the screws 21. The inner ring 13 of the bearing 11 and the collar 19 can be easily fitted onto the shaft 10 and the screws 21 are then tightened to some predetermined torque. The ends 23 of the screws 21, which can be tapered at the same angle as the surface 20 serve to contact the outer surface 20. When tightened, the ends 23 of the screws 21 press on the outer surface 20 to displace the axial end region 17 of the inner ring 13, and hence the entire inner ring 13, and the axial portion 18 of the collar 19 radially apart. This in turn causes diametrically opposed contact surface zones 24, 26 of the inner bore surface 9 of the ring 13 and of the bore surface 22 in the end wall 25 of the collar 19 to clamp against the shaft 10 radially and uniformly without causing damage to the shaft 10. To release the locking device 12, the screws 21 are untightened to permit the collar 19 and the bearing 11 to be withdrawn from the shaft 10.

The end wall 25 of the collar 19 and the end of the axial region 17 of the ring 13 abut to form sliding guide surfaces 50 as the screws 21 are tightened or released.

Figure 4:
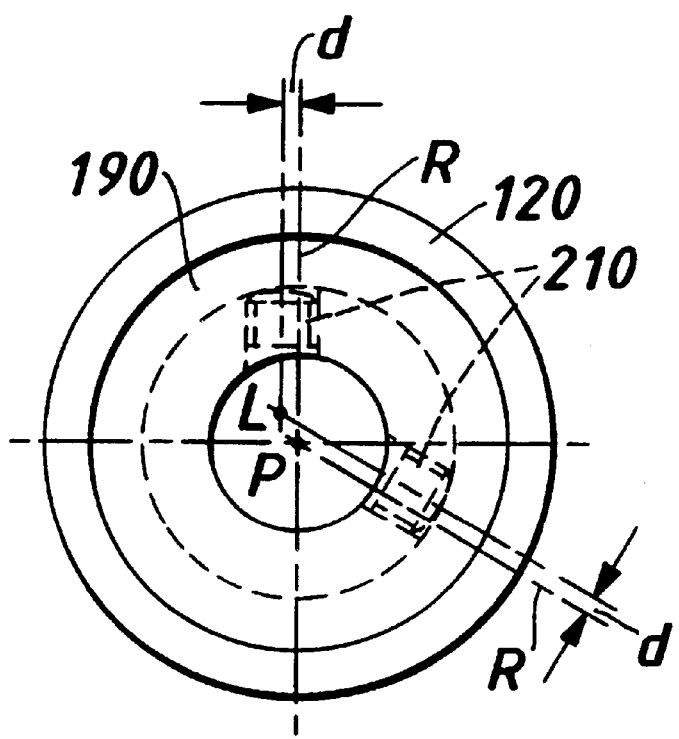
FIG. 4 is an end view of the assembly shown in FIG. 3 taken in the direction of arrow IV in FIG. 3.

As shown in FIGS. 3 and 4 another locking device 12 is fitted inside a hollow shaft or tube 120. The locking device is again composed of a collar 190 and a separate ring 170. The collar 190 has an axial region 180 with two angularly offset threaded bores 220 receiving screws 210. An end wall 250 of the collar 190 has an outer peripheral surface 280 which is parallel to and confronts an inner surface 300 of the tube 120. The ring 170 has an outer peripheral surface 240 which is parallel to and likewise confronts the inner surface 300 of the tube 120 and an inner surface 200 which is tapered at an angle to the axis of the tube 120. The surface 200 diverges from the end wall 250 relative to the axis of rotation P. As with the first embodiment, the surface 200 can be inclined at an angle of 1° to 5° and preferably 3° to the axis of the tube 120. The surface 200 can contain shallow recesses, depressions or blind bores for receiving the ends 230 of the screws 210.

As shown in FIG. 4, the screws 210 and the threaded bores 220 are offset by the same distance 'd' from radial planes R, in an anti clockwise direction. The radial planes R are spaced apart by 120° and represent the preferred locations of the screws 210 in accordance with UK patent application 2282209A. In contrast to the latter, the longitudinal axes of the screws 210 now intersect at a point L spaced from the axis of rotation P and offset therefrom in an anti clockwise sense as viewed in the direction of arrow IV, i.e. in the direction of the axis P and the divergence of the surface 200 from the end wall 250 of the collar 190.

The device 12 is locked to the tube 120 by tightening the screws 210 to cause their ends 230 to displace the axial region 180 of the collar 190 and the ring 170 radially apart. This in turn causes diametrically opposed surface contact zones 290, 291 of the surface 280 of the collar end wall 250 and of the surface 240 of the ring 170 to bear against the inner surface 300 of the tube 120 to lock the device in place.

The ring 170 and the end wall of the collar 190 have radial faces which abut and establish slidable guide surfaces 350 as the screws 210 are tightened or released. The device can be used to provide an abutment or location for some other component such as a bearing.

In contrast to some known forms of locking device or mechanisms, a device in accordance with the invention does not damage the rotatable component and is easily fitted and removed repeatedly. The device also rotates uniformly with the rotatable component without any wobble.

In the FIG. 1 arrangement the inner ring 13 is simply extended and easily machined in one operation. There is no need to provide tapped bores in the ring 13. Also since no excessive tensile stresses are created on the inner ring 13 there is no danger of fracture for this reason. There is also no distortion so the raceways for the balls are unaffected.

What is claimed is:

1. In a device for locking to a component rotatable about an axis; said device comprising collar means having an end wall with a bore defining a surface for confronting an outer surface of the rotatable component and a region extending axially from the end wall, a ring for disposing between the axial region of the collar means and the component, the ring having a first inner surface for confronting the outer surface of the component and a second outer surface which is inclined relative to the axis of rotation to converge with respect to the axis of rotation in a direction away from the end wall and at least two screw-threaded elements received in screw-threaded bores extending through the axial region of the collar means and spaced apart relative to the rotational axis other than at 180°, the screw-threaded elements being adjustable to tighten and contact the second inclined surface of the ring or to be released from such contact; wherein when the screw-threaded elements are released from such contact the collar means is free to rotate about the axis relative to the ring and when the screw-threaded elements are tightened to bear into or against the second outer surface of the ring radial displacement of the collar means and the ring relative to the axis then occurs thereby to cause the bore surface of the collar means and the first surface of the ring to act as contact surfaces with respect to the outer surface of the component and exert clamping force on the component at diametrically opposed zones; the improvement wherein the threaded bores are disposed in positions non-radial relative to the rotational axis.

2. A device according to claim 1 wherein the threaded bores have axes which intersect at a location offset from the rotational axis and disposed on a radius from the rotational axis which is displaced from a vertical radial plane in an anti-clockwise sense as viewed in the direction of the rotational axis from the end wall of the collar means.

3. A device according to claim 2 wherein the threaded bores for receiving the screw-threaded elements are spaced apart by 120° relative to the location at which the axes of their associated bores intersect.

4. A device according to claim 1 wherein the confronting surface of the collar means and the first surface of the ring lie closely adjacent to form a continuation of one another.

5. A device according to claim 4 wherein between the confronting surface of the collar means and the first surface of the ring there are radially abutting guide surfaces of the collar means and of the ring which slide against one another as the screw-threaded elements are tightened or released.

6. A device according to claim 1 wherein the screw-threaded elements have end surfaces for contacting the second surface of the ring which are inclined relative to the axis of rotation.

7. A device according to claim 1 wherein there are two screw-threaded elements.

8. A device according to claim 1 wherein the second surface of the ring has one of depressions, recesses or blind bores for receiving the ends of the screw-threaded elements.

9. A device according to claim 1, wherein the rotatable component is a solid shaft or spindle.

10. A device according to claim 9 wherein the ring is itself another component of, or part of, some other structure which is to be locked with the device.

11. A device according to claim 10 wherein the ring is formed by an extended region of the inner ring of a rolling element bearing.

12. A device according to claim 1 wherein the second surface of the ring is inclined at an angle of 1° to 5° to the axis of rotation.

13. In a device for locking to a hollow component rotatable about an axis; said device comprising collar means having an end wall with an outer surface for confronting an inner surface of the component and a region extending axially from the end wall; a ring for disposing between the axial region of the collar means and the component, the ring having a first outer surface for confronting the inner surface of the component and a second inner surface which is inclined relative to the axis of rotation to diverge with respect to the axis of rotation in a direction away from the end wall and at least two screw threaded elements received in screw-threaded bores extending through the axial region of the collar means and spaced apart relative to the rotational axis other than at 180° the screw-threaded elements being adjustable to tighten to bear into or against the second inner surface of the ring so radial displacement of the collar means and the ring relative to the axis then occurs to cause the outer surface of the ring and the outer surface of the end wall of the collar means to act as contact surfaces with respect to the inner surface of the component and exert clamping force on the component at diametrically opposed zones; the improvement wherein the threaded bores are disposed in non-radial positions relative to the rotational axis.

14. A device according to claim 13 wherein the threaded bores have axes which intersect at a location offset from the rotational axis and disposed on a radius from the rotational axis displaced from a vertical radial plane in an anti-clockwise sense as viewed in the direction of the rotational axis from the end wall of the collar means.

15. A device according to claim 13 wherein the component is a hollow shaft or tube.

16. A device for locking to a component rotatable about an axis; said device comprising a collar with an end wall containing a bore defining an inner surface for fitting over and confronting an outer surface of the component and a region extending axially away from the end wall;

a ring for disposing between the axial region of the collar and the component, the ring having a first inner surface for fitting over and confronting said surface of the component and a second outer surface which is inclined relative to the axis of rotation to converge with respect to the axis of rotation in a direction away from the end wall and several screw-threaded elements received in threaded bores extending through the axial region of the collar and generally towards the axis of rotation and spaced apart relative to the rotational axis other that at 180°, wherein the confronting surfaces of the collar and the ring act as contact surfaces for contacting the outer surface of the component during use wherein the screw-threaded elements are adjustable to tighten and contact the second inclined surface of the ring or to be released from such contact, whereby when the screw-threaded elements are released from such contact the collar can be rotated freely about the axis relative to the ring and when the screw-threaded elements are tightened to bear into or against the second surface of the ring radial displacement of the collar and the ring relative to the axis then occurs to cause the inner surface of the collar and the first surface of the ring to exert radial clamping force on the component at diametrically opposed zones.

17. A device according the claim 16 wherein during use the inner surface of the collar and the first surface of the ring lie closely adjacent to form a continuation of one another.

18. A device according to claim 17 wherein between the inner surface of the collar and the first surface of the ring there are radially abutting guide surfaces of the collar and of the ring which side against one another as the screw-threaded elements are tightened or released during use.

19. A device according to claim 16 wherein the screw-threaded elements have end surfaces for contacting the second surface of the ring which are inclined relative to the axis of rotation.

20. A device according to claim 16 wherein there are two screw-threaded elements.

21. A device according to claim 20 wherein the threaded bores for receiving the screw-threaded elements are spaced apart by 120° relative to the axis of rotation.

22. A device according to claim 16 wherein the second contact surface of the ring has one of depressions, recesses or blind bores for receiving the ends of the screw-threaded elements.

23. In combination: a component rotatable about an axis and a device for selectively locking to the component, said device comprising a collar with an end wall containing a bore defining an inner surface fitting over and confronting an outer surface of the component and a region extending axially away from the end wall; a ring disposed between the axial region of the collar and the component, the ring having a first inner surface fitting over and confronting said surface of the component and a second outer surface which is inclined relative to the axis of rotation to converge with respect to the axis of rotation in a direction away from the end wall and several screw-threaded elements received in threaded bores extending through the axial region of the collar and generally towards the axis of rotation and spaced apart relative to the rotational axis other that at 180°, wherein the confronting surfaces of the collar and the ring act as contact surfaces contacting the surface of the component and the screw-threaded elements are adjustable to tighten and contact the second inclined surface of the ring or to be released from such contact, whereby when the screw-threaded elements are released from such contact the collar can be rotated freely about the axis relative to the ring and when the screw-threaded elements are tightened to bear into or against the second surface of the ring radial displacement of the collar and the ring relative to the axis occurs to cause the inner surface of the collar and the first surface of the ring to exert radial clamping force on the component at diametrically opposed zones.

24. The combination of claim 23 wherein the rotatable component is a solid shaft or spindle and the ring is formed by an extended region of the inner ring of a roller element bearing.

25. A device for locking to a hollow component rotatable about an axis; said device comprising a collar with an end wall defining an outer surface for fitting into and confronting an inner surface of the component and a region extending axially away from the end wall, a ring for disposing between the axial region of the collar and the component, the ring having a first outer surface for fitting over and confronting said inner surface of the component and a second inner surface which is inclined relative to the axis of rotation to diverge with respect to the axis of rotation in a direction away from the end wall and several screw-threaded elements received in threaded bores extending through the axial region of the collar and generally towards the axis of rotation and spaced apart relative to the rotational axis other than at 180°, wherein the confronting surfaces of the collar and the ring act as contact surfaces for contacting the inner surface of the component during use and the screw-threaded elements are adjustable to tighten and bear into or against the second inner surface of the ring so radial displacement of the collar and the ring relative to the rotational axis then occurs to cause the outer surface of the collar and the first surface of the ring to exert radial clamping force on the component at diametrically opposed zones.

26. A device according to claim 25 wherein during use the outer surface of the collar and the first surface of the ring lie closely adjacent to form a continuation of one another.

27. A device according to claim 25 wherein between the outer surface of the collar and the first surface of the ring there are radially abutting guide surfaces of the collar and of the ring which slide against one another as the screw-threaded elements are tightened or released during use.

28. A device according to claim 25 wherein the screw-threaded elements have end surfaces for contacting the second inner surface of the ring which are inclined relative to the axis of rotation.

29. A device according to claim 25 wherein there are two screw-threaded elements.

30. A device according to claim 29 wherein the threaded bores for receiving the screw-threaded elements are spaced apart by 120° relative to the axis of rotation.

31. A device according to claim 25 wherein the second inner surface of the ring has one of depressions, recesses or blind bores for receiving the ends of the screw-threaded elements.

32. In combination: a hollow component rotatable about an axis and a device for selectively locking to the component, said device comprising a collar with an end wall defining an outer surface confronting an inner surface of the component and a region extending axially away from the end wall, a ring disposed between the axial region of the collar and the component, the ring having a first outer surface confronting said inner surface of the component and a second inner surface which is inclined relative to the axis of rotation to diverge with respect to the axis of rotation in a direction away from the end wall and several screw-threaded elements received in threaded bores extending through the axial region of the collar and generally towards the axis of rotation and spaced apart relative to the rotational axis other than at 180°, wherein the confronting surfaces of the collar and the ring act as contact surfaces for contacting the inner surface of the component during use and the screw-threaded elements can be tightened to bear into or against the second inner surface of the ring whereby to cause the outer surface of the collar and the first surface of the ring to exert radially clamping force on the component at diametrically opposed zones.

33. A device for locking to a component rotatable about an axis; said device comprising a collar with an end wall defining a first surface for fitting and confronting a surface of the component with the first surface of the end wall extending parallel to said surface of the component and a region extending axially away from the end wall; a ring for disposing between the axial region of the collar and the component, the ring having a first surface for fitting and confronting said surface of the component with the first surface of the ring extending parallel to said surface of the component and a second surface opposite said first surface, said second surface being inclined relative to the axis of rotation to converge or diverge with respect to the axis of rotation in a direction away from the end wall and several screw-threaded elements received in threaded bores extending through the axial region of the collar and generally towards the axis of rotation and spaced apart relative to the rotational axis other than at 180°, wherein the first surfaces of the collar and the ring act as contact surfaces for contacting said surface of the component at axially-spaced locations during use and the screw-threaded elements are adjustable to tighten and contact the second inclined surface of the ring or to be released from such contact to permit the collar to freely rotate about the axis relative to the ring and when the screw-threaded elements are tightened to bear into or against the second surface of the ring relative radial displacement of the ring and the collar then occurs relative to the axis and relative to the component to cause the first surface of the collar and the first surface of the ring to exert radial clamping force on said surface of the component at diametrically opposed and axially spaced apart zones.

* * * * *